(No Model.) 2 Sheets—Sheet 1.

S. MARCUS.
MAGNETO ELECTRIC MACHINE.

No. 275,237. Patented Apr. 3, 1883.

Witnesses
William S. Poulter
Alfred L. Leonard

Inventor
Siegfried Marcus
pr Henry Orth
att'y

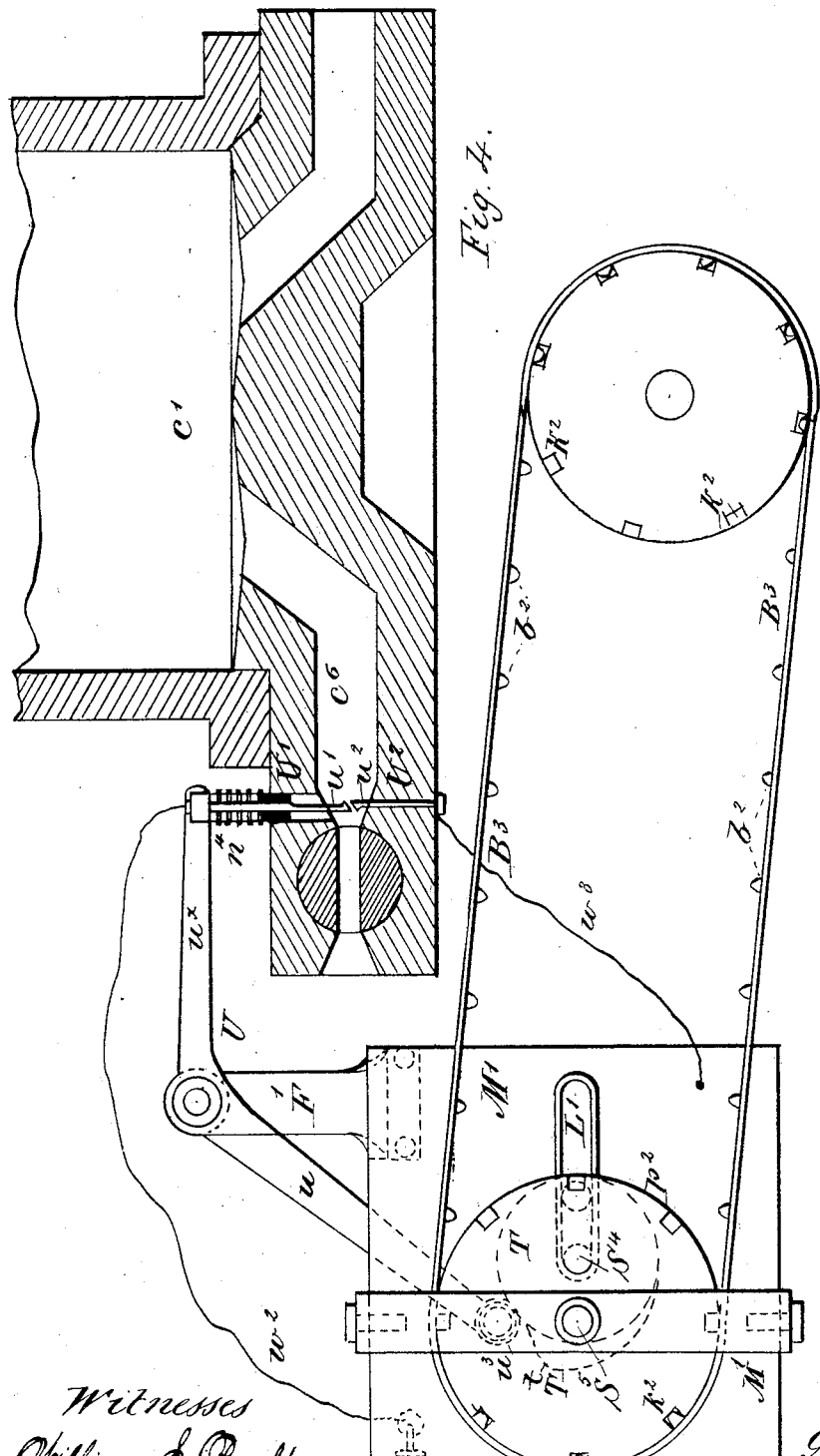

UNITED STATES PATENT OFFICE.

SIEGFRIED MARCUS, OF VIENNA, AUSTRIA-HUNGARY.

MAGNETO-ELECTRIC MACHINE.

SPECIFICATION forming part of Letters Patent No. 275,237, dated April 3, 1883.

Application filed November 24, 1882. (No model.) Patented in Belgium May 13, 1882, No. 57,900, and in Italy June 30, 1882, XVI, 14,290 and XXVIII, 401.

*To all whom it may concern:*

Be it known that I, SIEGFRIED MARCUS, a subject of the Emperor of Austria, residing at the city of Vienna, in the Austro-Hungarian Empire, have invented certain new and useful Improvements in Magneto-Electric Generators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to provide a means for automatically igniting gases or liquids by an electric spark produced from a current generated by a magneto-electric generator, thereby dispensing with the usual batteries and Ruhmkorff apparatus, and which is effective in a dry as well as a damp atmosphere.

My new igniting apparatus referred to in an application for patent for improvements in gas-engines filed June 12, 1882, consists of a magneto-electric generator and the proper lighter. The said generator may be a continuously-rotating magneto-electric apparatus, or may consist of magnetic inductors acted by periodical mechanical impulses.

Figure 2:
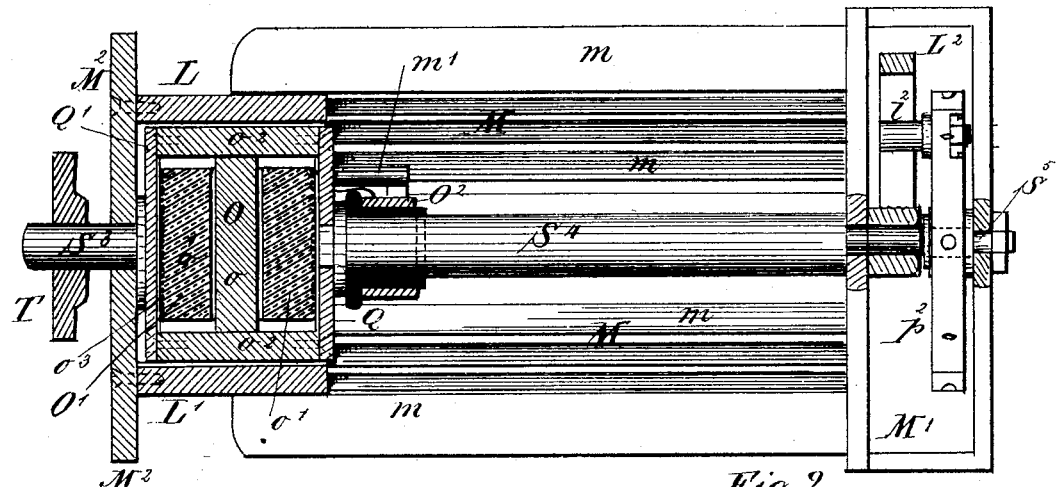
Figure 3:
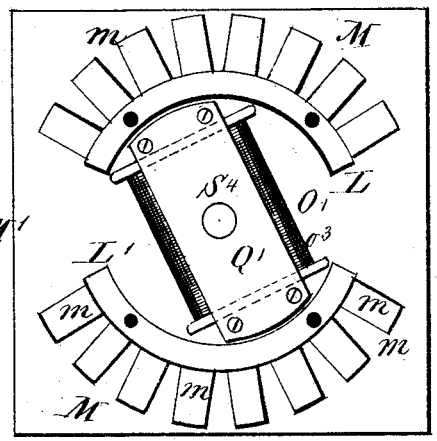
Figure 1:
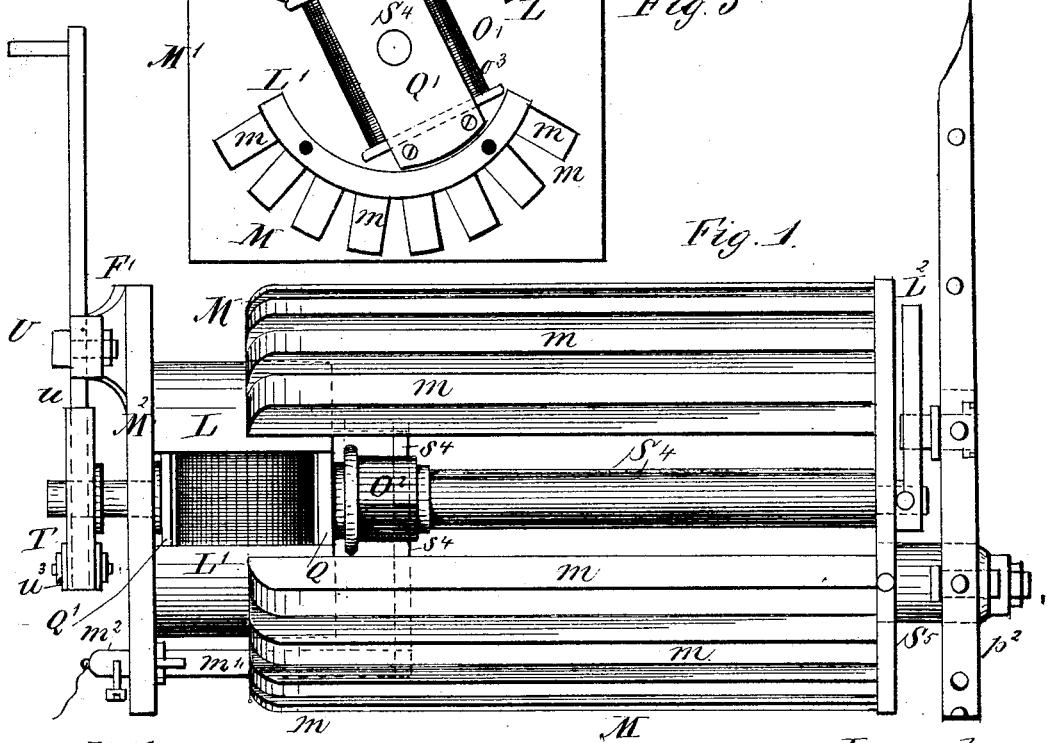

In the accompanying drawings is shown an igniting apparatus with a generator of the first description. Figures 1, 2, and 3 show in elevation, in vertical longitudinal section, and by an end view this magneto-electric generator; and Fig. 4 shows its application to a gas-engine for igniting and exploding the gases.

Like letters of reference indicate like parts wherever such may occur in the above figures of drawings.

L and L' are two metallic (iron) segments that form the two poles of a powerful field magnet or magnets, M, which latter is composed of a series of bar-magnets, $m$ $m$ $m$, &c., and the metallic framing M', to which said bar-magnets are screwed. The pole-segments L L' are attached to a square plate, $M^2$, of a material not influenced by magnetism, and which serves as a support and cover for the same. As shown by Fig. 3, the bar-magnets $m$ are arranged radially upon the pole-segments and in two groups of an equal number opposite each other. These two groups of bar-magnets may, however, be replaced by two single powerful magnets of a suitable form.

Between the pole-segments is located the induction-coil O' and its armature O, mounted upon a two-part shaft, $S^3$ $S^4$. The armature is composed of a metallic core, $o$, and two metallic disks, $o^2$, (of soft iron or other suitable metal.) The coil O' is composed of a bobbin, $o'$, of a suitable isolating substance, mounted on the core $o$, and upon which is wound the isolated copper wire $o^3$, one end of which coil is connected with the metallic part of the apparatus, and the other with a sleeve, $O^2$, mounted upon the part $S^4$ of the two-part shaft, and from which it is isolated. The latter part of this shaft has its bearings in the framing M' and a plate, Q, and the part $S^3$ of said shaft has its bearings in a plate, Q', and the plate $M^2$, said plates Q Q' being secured to the armature O and serve to connect the shaft therewith. The plate $M^2$ carries a binding-screw, $m^2$, isolated therefrom, said screw being in metallic connection with the sleeve $O^2$ through the metallic bar $m'$ and the contact-spring $s^4$. Upon the part $S^4$ of the shaft within the framing or supporting-plate M' is mounted a slotted lever, $L^2$, which is actuated or carried along by the pin or stud $l^2$, secured to a belt-pulley, $p^2$, mounted upon a short shaft, $S^5$, that has its bearings in the metallic framing M', said shaft having its bearings eccentric to those of shaft $S^3$ $S^4$, and being rotated in any way by means of its belt-pulley $p^2$— for instance, through a belt-pulley on the main crank-shaft of the gas-engine to which the igniting apparatus belongs. By means of this arrangement a differential speed is imparted to the shaft $S^4$ $S^3$ and induction-coil.

As the igniting and exploding of the gas or liquid must in all cases be effected at regular intervals, and as the regularity of the intervals depends on the uniform rotation of the shaft $S^3$ $S^4$, upon which is mounted the cam T, hereinafter described, and operating the lighter, the uniformity of the rotary movement of pulley $p^2$ and of that pulley of the engine which actuates it by means of a belt or cord is of great importance. This end may be obtained in any desired manner and by any of the well-known means. I have, as shown in Fig. 4, constructed the two belt-pulleys with peripheral recesses $k^2$, and the belt $B^3$ with projections or teeth $b^2$, that engage the recesses $k^2$, and thus uniformly rotate the pulleys and prevent any slip of the belt $B^3$.

By the above-described construction and extension of the poles of the field magnet or magnets over the entire width of the pole-segments on the one hand, and especially the application of the lever movement to rotate the induction-coil on the other hand, the armature is exposed sufficiently long to the magnetic influence of the bar-magnets to secure a complete and thorough magnetization thereof, while the change in polarity follows very rapidly.

Having described the magneto-electric generator, I will now describe the lighter itself.

Upon a standard, $F'$, secured to the plate $M^2$ of the magneto-electric generator, is secured an angular or two-armed lever, U, and upon the part $S^3$ of the two-part shaft of said generator is mounted a cam, T, upon which rides the extremity of the arm $u$ of lever U, which extremity may be provided with an antifriction roller, $u^3$, for obvious purposes. The arm $u^x$ of lever U carries a metallic pin, U′, that penetrates into the exploding-chamber $c^6$. The pin moves gas-tight within the aperture through which it passes, and carries a coiled spring, $n^4$, the tension of which tends to force the lever-arm and pin outward from the exploding-chamber $c^6$. A second pin, $U^2$, projects some distance into the exploding-chamber and upon the same plane as the pin U′, the poles of the induction-coil being connected with said pins by wires $w^2$ $w^3$ through the binding-screw $m^2$ and the metallic portion of the generator. As plainly shown in Fig. 4, each pin U′ $U^2$ terminates in an enlargement on contact point or button $u'$ $u^2$, respectively. As the cam T rotates, the arm $u^x$ of lever U is slowly moved inward, when the roller $u^3$ moves up the incline of the cam, and when at its highest point or greatest distance from the center of the cam the contact-point $u'$ of pin U′ will be in contact with the point $u^2$ of pin $U^2$, and immediately thereafter the extremity of the lever-arm $u$ will drop over the nose $t$ of the cam T and the contact of the two pins will be interrupted. The sudden interruption of the contact between the points $u'$ $u^2$ produces the spark that ignites the gas or liquid in chamber $c'$. Thus it will be seen that at each revolution of the cam T the gas or liquid is ignited.

I have described hereinbefore mechanism whereby a differential motion is imparted to the induction-coil and its shaft, and the object of imparting such a movement to the coil and shaft will be apparent, for the reason that it is necessary that the coil, during a portion of its rotation, should be moved sufficiently slow to insure its thorough magnetization, in order to obtain the necessary current strength to produce the spark, and it should be moved sufficiently fast to break the current as suddenly as possible, in order to produce the spark to ignite the gas or liquid; and, as will be readily understood, the cam T will be so mounted upon its shaft as to cause the separation of the contact-pins at the proper time; hence said cam is operated from and timed by the rotatory movement of a pulley mounted upon some suitable part of the engine with which the igniting apparatus is combined. Moreover, the alternate closing and breaking of the contact between pins U′ and $U^2$ must correspond in such a manner to the movement of the induction-coil which produces the current that said pins are in contact during the magnetization of the core, and separate themselves suddenly in the moment when demagnetization begins—viz., when the polarity of the core is reversed.

Having now described my invention, what I claim is—

1. The herein-described magneto-electric generator, consisting of a field-magnet composed of two independent series of bar-magnets, (or their specified equivalent,) connected at one end to and extending over two pole-segments placed at a distance and isolated from each other, and in metallic connection at the other end through a supporting-plate common to both series, an armature arranged to rotate between said pole-segments, an armature-shaft, and mechanism, substantially as described, to impart a differential speed to said shaft, substantially as described, and for the purposes specified.

2. The combination, with the bar-magnets $m\,m$, &c., the pole-segments L L′, and the supporting-plates M′ $M^2$, of the armature O O′ Q Q′, the two-part shaft $S^3$ $S^4$, and mechanism, substantially as described, for rotating said shaft, substantially as and for the purposes specified.

3. The combination, with the field-magnets, constructed substantially as shown and described, and the plates M′ $M^2$, of the armature O O′ Q Q′, the two-part shaft $S^3$ $S^4$, the insulated sleeve $O^2$, contact-spring $s^4$, bar $m'$, binding-screw $m^2$, and mechanism for rotating said shaft and armature, substantially as described, for the purposes specified.

4. The combination, with a suitable rotating part of the engine with which the igniting apparatus is connected, of a magneto-electric generator having a rotating induction-coil and appliances for imparting a differential speed to said coil from the above-said rotating part, as described, and for the purpose specified.

5. The combination, with an electric generator, of a lighter consisting of two contact-pins placed within the exploding-chamber and arranged to periodically close and interrupt an electric current to produce the igniting-spark, the movements of said pins being operated from and timed by any suitable part of the engine with which the igniting apparatus is connected, as described.

6. The combination, with a suitable rotating part of the engine to which belongs the igniting apparatus, and the two-part shaft $S^3 S^4$ of the magneto-electric generator, and the slotted lever $L^2$, of the belt-pulley $p^2$ and a corresponding pulley on above-said rotating part, pulley $p^2$, carrying a stud or wrist-pin, $l^2$, all arranged for co-operation as described.

7. The combination, with the contact-pin $U^2$, arranged within the exploding-chamber, a magneto-electric generator, and one of the pole-wires thereof, of the lever U, its contact-pin $U'$, and the other pole-wire of said generator, and mechanism timed to the movements of any suitable part of the main engine, for periodically moving the pin $U'$ in contact with the pin $U^2$ and suddenly interrupting said contact, substantially as and for the purposes described.

8. The combination, with a suitable rotating part of the main engine, carrying a belt-pulley provided with peripheral recesses, the belt $B^3$, having projections $b^3$, and the belt-pulley $p^2$, provided with like peripheral recesses, and carrying a stud or wrist-pin, $l^2$, of the slotted lever $L^2$ and the two-part shaft $S^3 S^4$ of the electric generator, all arranged for operation as described.

9. The combination, with the two-part shaft $S^3 S^4$, the cam T, the two-armed lever U, and its pin $U'$, of the pin $U^2$ and the exploding-chamber, substantially as and for the purpose specified.

In testimony whereof I affix my signature in presence of two witnesses.

SIEGFRIED MARCUS.

Witnesses:
JAMES RILEY WEAVER,
WILLIAM HÜNING.